United States Patent [19]

Roarty et al.

[11] Patent Number: 5,127,781
[45] Date of Patent: Jul. 7, 1992

[54] CHASSIS CONVERSION SADDLE

[75] Inventors: Hugh J. Roarty, Bayonne; Robert E. Preller, Mount Holly, both of N.J.; Donald L. Miedama, Morrisville, Pa.

[73] Assignee: Sea-Land Corporation, Iselin, N.J.

[21] Appl. No.: 578,738

[22] Filed: Sep. 6, 1990

[51] Int. Cl.$^5$ .............................................. B65G 1/02
[52] U.S. Cl. ...................................... 410/82; 296/182; 220/1.5; 108/55.1; 410/52
[58] Field of Search .................. 410/52, 53, 54, 55, 410/68, 77, 82; 108/55.1; 220/1.5; 296/35.3, 182; 105/37.5

[56] References Cited

U.S. PATENT DOCUMENTS

| | | | |
|---|---|---|---|
| 1,699,882 | 1/1929 | Ferguson | 14/71.1 X |
| 2,958,538 | 11/1960 | Norris et al. | 414/498 |
| 3,122,764 | 3/1964 | Ambli | 14/71.3 |
| 3,161,151 | 12/1964 | Johansson | 410/54 |
| 3,342,522 | 9/1967 | Palen et al. | 410/87 |
| 3,439,822 | 4/1969 | Korodi | 410/52 |
| 3,480,174 | 11/1969 | Sherwood | 220/1.5 |
| 3,504,814 | 4/1970 | McCleary | 410/52 X |
| 3,690,485 | 9/1972 | Fischer et al. | 414/417 |
| 3,881,207 | 5/1975 | Jones, Jr. et al. | 14/69.5 |
| 3,899,092 | 8/1975 | Nordstrom | 410/77 X |
| 4,049,135 | 9/1977 | Glassmeyer | 410/82 X |
| 4,108,326 | 8/1978 | Bertolini | 296/181 X |
| 4,163,425 | 8/1979 | Bedard | 410/82 |
| 4,209,869 | 7/1980 | Trine et al. | 14/69.5 |
| 4,416,385 | 11/1983 | Clare et al. | 108/55.1 X |
| 4,537,540 | 8/1985 | Boughton | 410/82 X |
| 4,611,962 | 9/1986 | Braly et al. | 410/82 X |
| 4,650,381 | 3/1987 | Durkin | 410/82 X |

FOREIGN PATENT DOCUMENTS

6804313 9/1969 Netherlands .......................... 410/52

*Primary Examiner*—David A. Bucci
*Assistant Examiner*—James Eller
*Attorney, Agent, or Firm*—Scully, Scott, Murphy & Presser

[57] ABSTRACT

A chassis conversion saddle for a standard 40' ISO container trailer for converting it to allow it to carry a standard 20' intermodal container. The chassis conversion saddle is constructed to be carried by the container trailer, and includes a forward section, a central section and a rear section. The forward section of the conversion saddle includes two standard ISO corner castings for being secured to the two forward standard ISO corner fittings of a standard 40' ISO container trailer. The forward section lies at least partially above the raised forward portion of the container trailer which clears the fifth wheel of a tractor, and includes a downturned end where it connects to the central section of the conversion saddle. The central section of the conversion saddle is lower to the ground than the forward section, and includes an upper plane surface for receiving and supporting a standard 20° intermodal container. The rear section of the conversion saddle includes two standard ISO corner castings for being secured to the two rear standard ISO corner fittings of a standard 40' ISO container trailer. The rear section has an upper surface which extends substantially parallel to and coextensive with the upper plane surface of the central section, and also has a movable deck plate which is movable to provide a ramp between the floor of a standard 20° intermodal container and the upper surface of the rear section.

18 Claims, 4 Drawing Sheets

FIG.4

CHASSIS CONVERSION SADDLE

BACKGROUND OF THE INVENTION

1. Field of the Invention

The present invention relates generally to container handling systems, and more specifically relates to a chassis conversion saddle or frame useable in container handling systems for transporting standard ISO intermodal containers. More particularly, the subject invention pertains to a chassis conversion saddle for a standard 40' ISO container trailer for converting the container trailer to allow it to carry a standard 20' heavily loaded intermodal container.

A standard 20' container trailer and tractor has a sufficiently short spacing between the axles thereof that, under standard interstate shipping regulations the 20' container can only be loaded to 19 metric tons. In contrast thereto, the larger spacing between the axles of a 40' container and trailer would enable a standard 20' container loaded thereon to carry 24 metric tons, thereby enabling the standard 20' container to carry heavier loads.

In shipping and commerce today, standard 40' ISO (International Standards Organization) containers are frequently transported by standard 40' ISO container trailers and tractors. The 40' ISO containers are secured to the trailers by four standard ISO corner castings on the four corners of the container which are engaged by four standard ISO twist locks on the trailers.

Similarly in shipping and commerce today, standard 20' ISO intermodal containers are frequently used to transport merchandise, and these standard 20' ISO intermodal containers are transported through and by intermodal facilities such as ships, railroads, trucks, etc. which are all designed to transport and handle the standard 20' ISO intermodal containers. The standard 20' ISO intermodal containers are designed to be secured by four standard corner castings on the four corners thereof which are engaged by four standard ISO twist locks.

It would be advantageous to be able to transport standard 20' ISO international containers by standard 40' ISO container trailers and tractors.

2. Discussion of the Prior Art

Glassmeyer U.S. Pat. No. 4,049,135 is fairly pertinent to the present invention, and discloses an arrangement for handling standard ISO air cargo containers which includes a chassis adapter frame connected to the chassis of a highway trailer by means of twist locks. The adapter frame includes twist lock assemblies which are adapted to engage the base of an air cargo container, whereby the adapter frame may be selectively removed from the container if desired. The arrangement includes loading and conveying arrangements which are particularly suited for transporting the air freight container with the adapter frame connected thereto or removed therefrom. Standard ISO air containers built to international standard dimensions have a rectangular box configuration of eight feet by eight feet by twenty feet. An important requirement for air cargo containers is that they must have a minimum tare-weight versus volume ratio. This is accomplished by constructing a container so that it is possible to leave the container underframe or base support structure on the ground when the container is loaded onto the airplane. The underframe is necessary when transporting the container by means of lift trucks or other loading devices, but the underframe is not necessary when the container is supported on the floor of an airplane. This patent pertains to a handling system whereby air containers and separable adapter or transporter frames are utilized in the transportation of the containers to the airplane, but are removed before the container itself is transported by means of roller conveyors into the interior of the fuselage of the plane. This patent provides for either the side transfer of containers from the adapter frame directly to a power conveyor system, or the side transfer of containers with the adapter frame onto a transfer device which has power rollers for raising the containers vertically from the adapter frame and thereby conveying the same into the airplane. The patent uses a transporter or adapter frame which is readily attached to the base of a container by means of twist lock assemblies. The adapter frame in turn is attached with a container fastened thereto to a trailer chassis by means of twist lock assemblies normally provided on such trailer chassis.

U.S. Pat. No. 4,537,540 discloses a transport frame for ISO standard containers which is intended to adapt the ISO standard to a particular freight handling system.

U.S. Pat. No. 3,690,485 discloses a pallet particularly adapted for handling air freight containers with a plurality of roller bearing members therein. The top portion of the frame is separable and may be used to adapt an air freight container to ISO standards.

U.S. Pat. No. 3,480,174 discloses a frame for adapting a plurality of smaller containers to ISO standards, which appears to be a 20' ISO frame having ISO standard twist locks.

U.S. Pat. No. 3,161,151 discloses a cradle for carrying standard ISO containers on a flat car to transport the containers in a railroad environment.

U.S. Pat. Nos. 3,342,522, 3,439,822 and 4,163,425 disclose modifications, such as moveable bolsters, to adapt a trailer chassis or truck chassis to carry or handle ISO standard containers. Each of these bolsters is a separable piece and it must be separately loaded and adjusted for each haul.

U.S. Pat. No. 2,958,538 discloses a frame which includes a jacking means for raising the container for engaging or disengaging a truck chassis.

U.S. Pat. Nos. 3,122,764, 3,881,207 and 4,209,869 disclose loading dock platforms or levelers which pivot up and forward to provide a transition zone between a truck and a loading dock.

U.S. Pat. No. 1,699,882 discloses structural details of a loading dock adaptor.

SUMMARY OF THE INVENTION

Accordingly, it is a primary object of the present invention to provide a chassis conversion saddle for, a standard 40' ISO container trailer to enable it to transport a standard 20' intermodal container.

A further object of the subject invention is the provision of a chassis conversion saddle as described which utilizes standard ISO equipment and fittings.

One advantage provided by the present invention is that the larger spacing between the axles of a 40' container and trailer would enable a standard 20' container loaded thereon to carry 24 metric tons, thereby enabling the standard 20' container to carry heavier loads that a standard 20' container trailer and tractor, which has a sufficiently short spacing between the axles thereof that under standard interstate shipping regulations the 20' container can normally only be loaded to 19 metric tons.

Another advantage provided by the present invention is to allow a standard 40' container and tractor to carry a standard, 20' intermodal container, even with light loads, if so desired for any convenient reason.

In accordance with the teachings herein, the present invention provide s a chassis conversion saddle for a standard 40' ISO container trail for converting it to allow it to carry a standard 20' intermodal container. The chassis conversion saddle is constructed to be carried by the container trailer, and includes a forward section, a central section and a rear section. The forward section of the conversion saddle includes two standard ISO corner castings for being secured to the two forward standard ISO corner fittings of a standard 40' ISO container trailer. The forward section lies at least partially above the raised forward portion of the container trailer which clears the fifth wheel of a tractor, and includes a downturned end where it connects to the central section of the conversion saddle. The central section of the conversion saddle is lower to the ground than the forward section, and includes an upper plane surface for receiving and supporting a standard 20' intermodal container. The rear section of the conversion saddle includes two standard ISO corner castings for being secured to the two rear standard ISO corner fittings of a standard 40' ISO container trailer. The rear section has an upper surface which extends substantially parallel to and coextensive with the upper plane surface of the central section, and also has a movable deck plate which is movable to provide a ramp between the floor of a standard 20' intermodal container and the upper surface of the rear section.

In greater detail, the chassis conversion saddle is constructed with a frame defined by two main support beams extending horizontally and longitudinally between the front and rear ends of the conversion saddle. A plurality of cross beams extend horizontally between the two main support beams. The two main support beams have segments which correspond to the forward, central, and rear sections of the conversion saddle. The two main support beams are separated by a distance greater than the separation of the main support beams of a standard 40' ISO container trailer, such that they straddle and encompass the main support beams of the standard 40' container trailer. When the chassis conversion saddle is positioned on a trailer, the cross beams extending between the two main support beams of the conversion saddle are supported by the main support beams of the trailer. In position, the bottom faces of the cross beams of the central and rear sections define a first support plane, and rest on the central and rear portions of a standard 40 ISO container trailer. The bottom faces of the cross beams of the forward section define a second support plane lying above the first support plane and rest on the raised forward portion of a standard 40' ISO container trailer. The upper plane surface of the central section is defined by the upper surfaces of the two main support beams and the cross beams.

A standard 20' intermodal container is supported on the central section by the four corner castings of the intermodal container which are supported by the main support beams of the central section of the conversion saddle. The 20' intermodal container includes a floor frame and four standard ISO corner castings. The central section of the conversion saddle includes two supporting cross beams separated by approximately the length of a standard 20' intermodal container, such that the two supporting cross beams lie beneath the structural cross members at the lengthwise edges of a standard 20' intermodal container. The two main support beams have a twist lock adjacent to each lengthwise end of a standard 20' intermodal container, and the twist locks engage the corner castings of a standard 20' intermodal container.

The movable deck plate of the rear section has a first retracted position in which it is supported by the upper surfaces of the frame members of the rear section, with the upper surface of the movable deck plate being generally coextensive with and parallel to the upper surface of the rear section. The movable deck plate has a second extended position in which it extends as a loading ramp between the floor of a standard 20' intermodal container and the upper surface of the rear section. The forward end of the movable deck plate is pivotably mounted at the forward end of the rear section to allow the forward end of the movable deck plate to move from its first position in the upper plane of the rear section to its second extended position at the floor of a standard 20' intermodal container. The movable deck plate is substantially rectangular and has an angled lip at its forward edge. The rear of the movable deck plate is slidably mounted at the rear of the rear section to allow the movable deck plate to slide lengthwise with respect to the conversion saddle. The slidable mount includes a pair of races pivotably mounted and extending lengthwise along the rear section. Each race defines a groove extending substantially parallel to the length of the standard 40' ISO trailer, and the movable deck plate includes a pair of pins which engage the grooves in each race. The movable deck plate includes means for enabling it to be mechanically moved between its first and second positions, which includes pivotable eyelets in the upper surface of the movable deck plate, with the pivotable eyelets being separated by the nominal distance between the forks of a forklift such that they are engagable thereby

BRIEF DESCRIPTION OF THE DRAWINGS

The foregoing objects and advantages of the present invention for a chassis conversion saddle may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
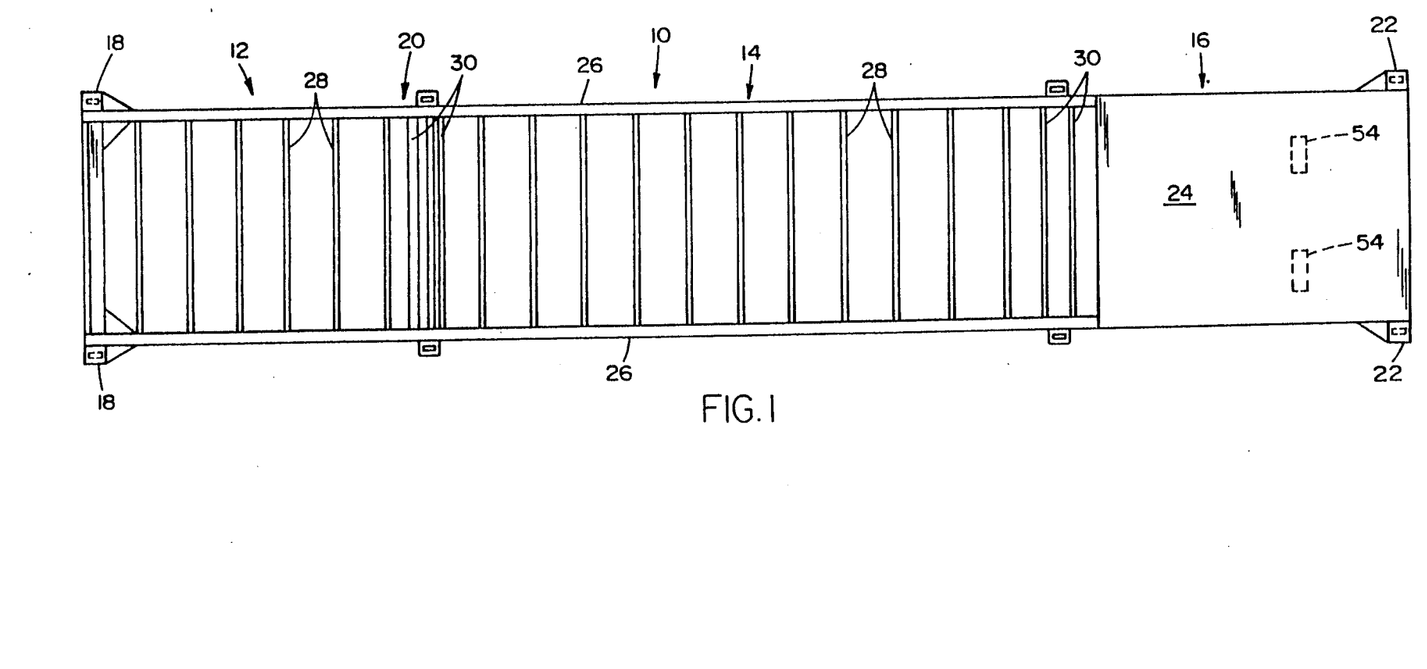
FIGS. 1 and 2 are respectively a top plan view and a side elevational view of an exemplary embodiment of a chassis conversion saddle constructed pursuant to the teachings of the present invention.
Figure 2:
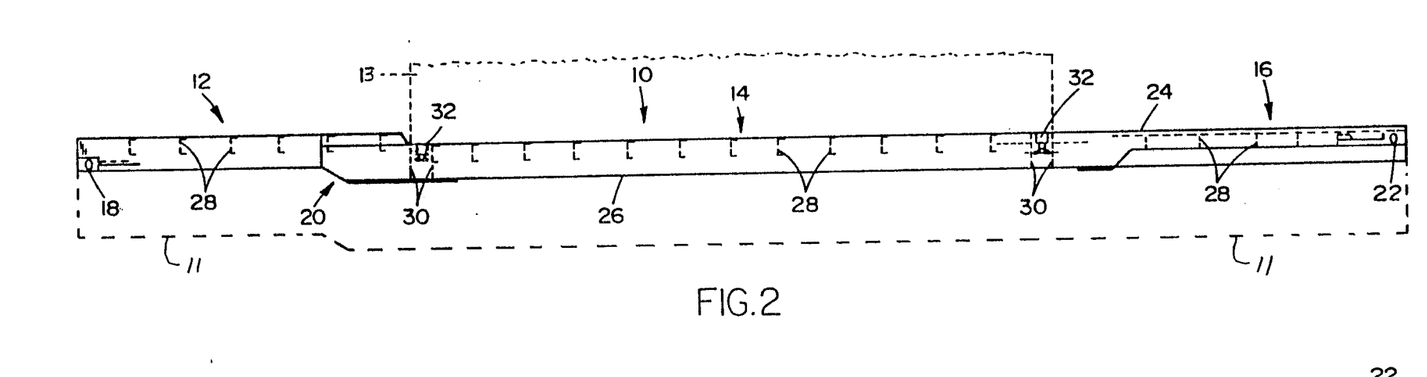

Referring to the drawings in detail, FIGS. 1 and 2 are respectively a top plan view and a side elevational view of an exemplary embodiment of a chassis conversion saddle 10 constructed pursuant to the teachings of the present invention.

The chassis conversion saddle 10 is designed for a standard 40' ISO container trailer 11, shown schematically in dashed lines, for converting it to allow it to carry a standard 20' intermodal container 13, shown schematically in dashed lines. The chassis conversion saddle is constructed to be carried by the container trailer, and includes a forward section 12, a central section 14, and a rear section 16. The forward section 12 of the conversion saddle includes two standard ISO corner castings 18 for being secured to the two forward standard ISO corner fittings of a standard 40' ISO container trailer 11. The forward section 12 lies at least partially above the raised forward portion of the container trailer which clears the fifth wheel of a tractor, and includes a downturned end 20 where it connects to the central section 14 of the conversion saddle. The central section 14 of the conversion saddle is lower to the ground than the forward section 12, and defines an upper plane surface for receiving and supporting a standard 20' intermodal container. The rear section 16 of the conversion saddle includes two standard ISO corner castings 22 for being secured to the two rear standard ISO corner fittings of a standard 40' ISO container trailer. The rear section 16 defines an upper surface which extends substantially parallel to and coextensive with the upper plane surface of the central section, and also has a movable deck plate 24 which is movable to provide a ramp between the floor of a standard 20' intermodal container and the upper surface of the rear section.

The chassis conversion saddle is constructed with a frame defined by two main support beams 26 extending horizontally and longitudinally between the front and rear ends of the conversion saddle. A plurality of cross beams 28 extend horizontally between the two main support beams 26. The two main support beams have segments which correspond to the forward, central, and rear sections of the conversion saddle, as illustrated best in FIG. 2. The two main support beams 26 are separated by a distance greater than the separation of the main support beams of a standard 40' ISO container trailer such that they straddle and a encompass the main support beams of the standard 40' container trailer. When the chassis conversion saddle is positioned on a trailer, the cross beams 28 extending between the two main support beams of the conversion saddle are supported by the main support beams of the trailer. In position, the bottom faces of cross beams of the central and rear sections define a first support plane and rest on the central and rear portions of a standard 40' ISO container trailer. The bottom faces of the cross beams of the forward section define a second support plane lying above the first support plane and rest on the raised forward portion of a standard 40' ISO container trailer. The upper plane surface of the central section is defined by the upper surfaces of the two main support beams 26 and the cross beams 28.

A standard 20' intermodal container 13 is supported on the central section by the four corner castings of the intermodal container which are supported by the main support beams 26 of the central section of the conversion saddle. The 20' intermodal container includes a floor frame and four standard ISO corner castings 34, FIG. 5. The central section of the conversion saddle includes two supporting cross beams 30 separated by approximately the length of a standard 20' intermodal container, such that the two supporting cross beams 30 lie beneath the structural cross members at the lengthwise edges of a standard 20' intermodal container. The two main support beams have a twist lock 32, FIG. 2, adjacent to each lengthwise end of a standard 20' intermodal container, and the twist locks 32 engage the corner castings 34 (see FIG. 5) in the standard 20' intermodal container.

Figure 3:
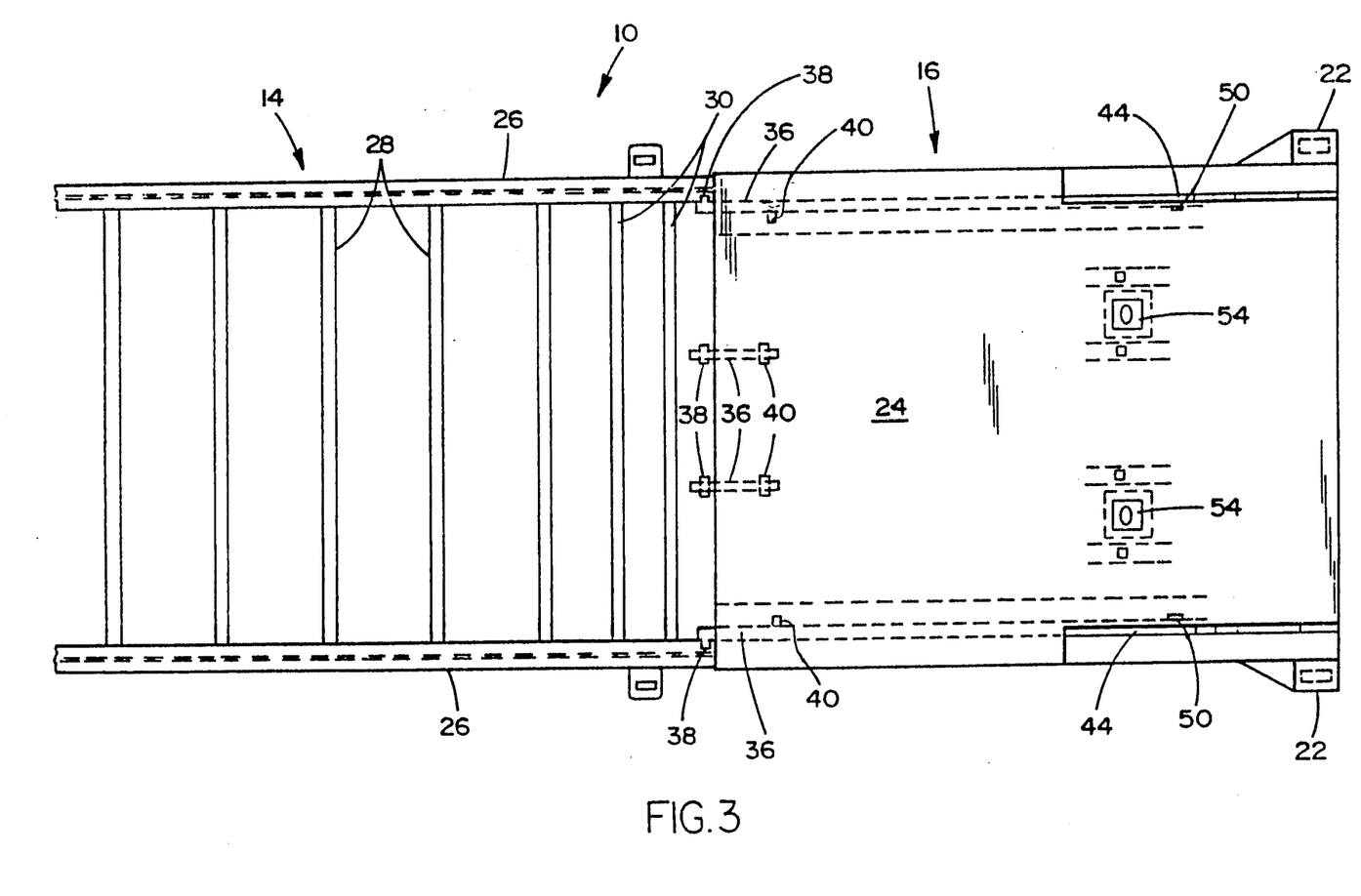
FIGS. 3 and 4 illustrate top plan views of first and second positions of a movable deck plate provided on the chassis conversion saddle, which provides a ramp to the floor of a standard 20' intermodal container carried by the chassis conversion saddle.
Figure 4:
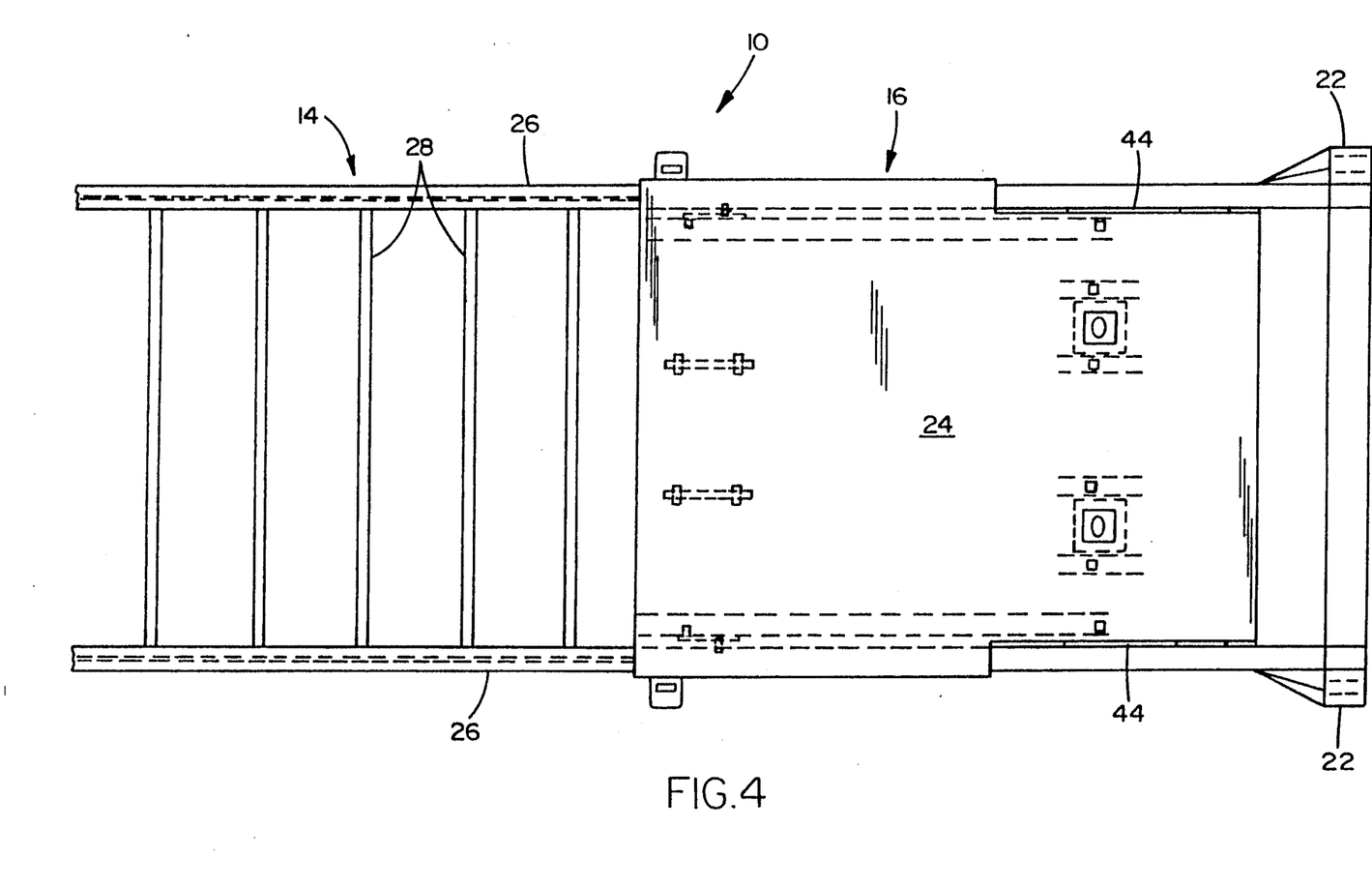

FIGS. 3 and 4 illustrate top plan views of first and second positions of the movable deck plate 24, which provides a ramp to the floor of a standard 20' intermodal container 13 carried by the chassis conversion saddle. The movable deck plate 24 of the rear section has a first retracted position, FIG. 3, in which it is supported by the upper surfaces of the frame members of the rear section 16, with the upper surface of the movable deck plate being generally coextensive with and parallel to the upper surface of the rear section. The movable deck plate 24 has a second extended position, FIG. 4, in which it extends as a loading ramp between the floor of a standard 20' intermodal container and the upper surface of the rear section 16. The forward end of the movable deck plate is pivotably mounted at the forward end of the rear section to allow the forward end of the movable deck plate to move from its first position in the upper plane of the rear section to its second extended position at the floor of a standard 20' intermodal container. The movable deck plate is substantially rectangular and has an angled lip 35 at its forward edge.

Figures 5, 5A, 5B:
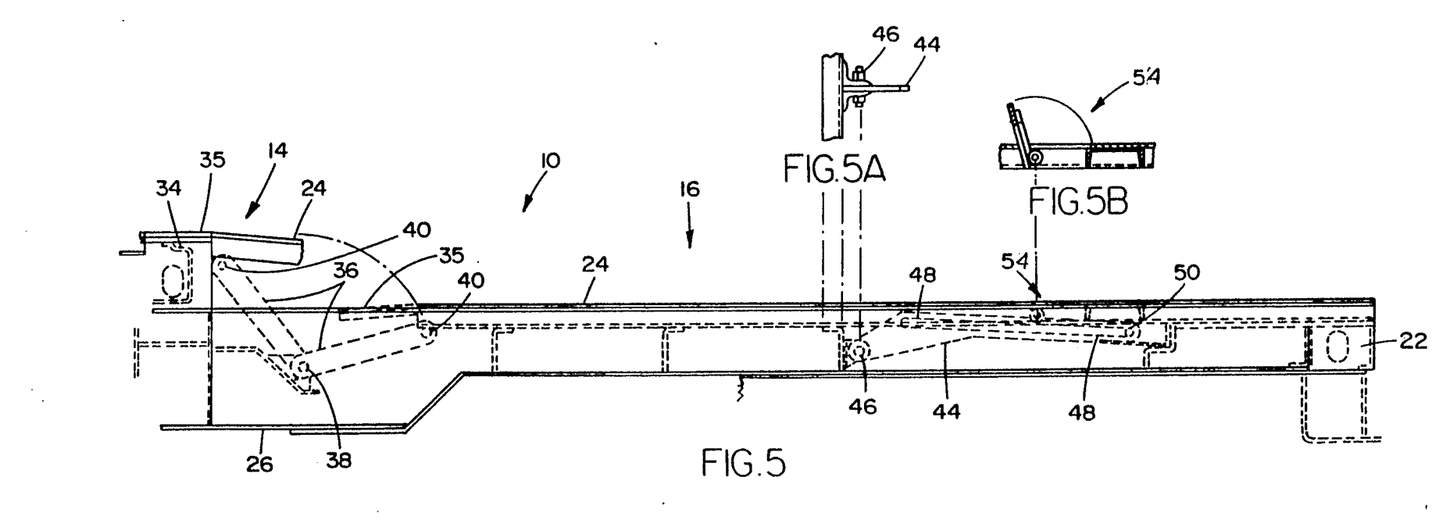
FIGS. 5, 5A and 5B illustrate views of the support and pivoting mechanisms which allow the movable deck plate to be moved between its first and second position.

FIG. 5 illustrates a side elevational view of the support and pivoting mechanisms which allow the movable deck plate to be moved between its first and second position, both of which positions are illustrated in FIG. 5. The support and pivoting mechanisms include four pivot arms 36, evenly spaced along the movable deck plate 24, secured by pivot pins 38 at their lower stationary ends to the frame near the rear end of the central section, and secured by pivot pins 40 at their upper movable ends to the frame of the movable deck plate. In this manner, the movable deck plate is pivotally mounted at its forward end to swing between a retracted position as shown in FIG. 3 where it is supported by the tops of the frame members in the rear section in a position substantially flush with the top surface of the rear section, and an extended position as shown in FIGS. 4 and 5 where it is supported by the angled lip 35 resting on the rear floor of the standard 20' intermodal container.

The rear of the movable deck plate 24 is slidably mounted at the rear of the rear section to allow the movable deck plate 24 to slide lengthwise with respect to the conversion saddle. The slidable mount includes a pair of races 44, positioned on opposite sides of the deck plate, each of which is pivotably mounted at 46 and extends lengthwise along the rear section. Each race 44 defines a groove 48 extending substantially parallel to the length of the standard 40' ISO trailer, and the movable deck plate includes a pair of pins 50 which engage the grooves 48 in each race 46. The movable deck plate includes means for enabling it to be mechanically moved between its first and second positions, which includes pivotable eyelets 54 in the upper surface of the movable deck plate, shown in both extended and retracted positions in FIG. 5, with the pivotable eyelets 54 being separated by the nominal distance between the forks of a forklift, such that a forklift can be used to reposition the movable deck plate in either of its two positions.

Figure 6:
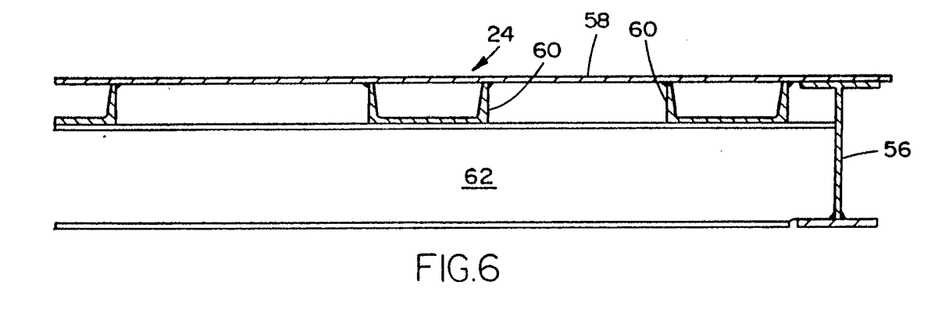
FIG. 6 is a sectional illustration of one embodiment of the frame of the movable deck plate.

FIG. 6 is a sectional illustration of one embodiment of the frame of the movable deck plate, which includes two main I beams 56, one on each side thereof, a surface plate 58 supported by a plurality of beams 60 supported on top of a plurality cross beams 62 extending between the two main I beams 56.

While a preferred embodiment and variations of the present invention for a chassis conversion saddle are described in detail herein, it should be apparent that the disclosure and teachings of the present invention will suggest many alternative designs to those skilled in the art.

What is claimed is:

1. A chassis conversion saddle for a standard 40' ISO container trailer, said trailer comprising a raised forward portion, raised relative to central and rear portions of the container trailer, and said trailer further comprising two main support beams separated by a separation distance, forward standard ISO corner fittings on said forward portion and rear standard ISO corner fittings on said rear portion, for converting the container trailer to carry a standard 20' intermodal container having a floor and standard corner castings, comprising:
   a. a forward section of the conversion sadle having means for being secured to the forward standard ISO corner fittings of the standard 40' ISO container trailer, said forward section lying at least partially above the raised forward portion of the container trailer which clears a fifth wheel of a tractor, and said forward section having a downturned end wherein connects to a central section of the conversion saddle;
   b. a central section of the conversion saddle connected to the downturned end of the forward section and being lower than said forward section, said central section having an upper plane surface for receiving and supporting the standard 20' intermodal container, and means for interfitting with and securing to the standard corner castings of the standard 20' intermodal container;
   c. a rear section of the conversion saddle extending rearwardly from said central section to the end of the trailer and having means for being secured to the rear standard ISO corner fittings of the standard 40' ISO container trailer, said rear section having an upper surface which extends substantially parallel to and coextensive with the upper plane surface of said central section, said rear section having a movable deck plate which is movable to provide a ramp between the floor of the standard 20' intermodal container and the upper surface of said rear section, wherein a forward end of said movable deck plate is pivotably mounted near a forward end of said rear section of the conversion saddle to allow the forward end of said movable deck plate to move from a first position in the upper plane of said rear section to a second position at the floor of the standard 20' intermodal container supported on said central section, and further wherein a rear end of said movable deck plate is slidably mounted by a slidable mount near a rear end of said rear section to allow the movable deck plate to slide lengthwise with respect to the conversion saddle.

2. A chassis conversion saddle as in claim 1, wherein two main support beams extend horizontally and longitudinally between front and rear ends of the conversion saddle as a frame for the forward, central and rear sections of the conversion saddle, and a plurality of cross beams extend horizontally between the two main support beams of the conversion saddle.

3. A chassis conversion saddle as in claim 2, wherein said two main support beam of the conversion saddle have segments which correspond to the forward, central, and rear sections of the conversion saddle.

4. A chassis conversion saddle as in claim 3, wherein said tow main support beams of the conversion saddle are separated by a distance greater than the separation distances of the two main support beam of the standard 40' ISO container trailer.

5. A chassis conversion saddle as in claim 4 wherein said cross beams extending between the two main support beams of the conversion saddle are supported by the two main support beams of the trailer.

6. A chassis conversion saddle as in claim 5, wherein bottom faces of said cross beams of the central and rear sections define a first support plane and rest on the central and rear portions of the standard 40' ISO container trailer.

7. A chassis conversion saddle as in claim 6, wherein bottom faces of said cross beams of the forward section define a second support plane lying above the first support plane and rest on the raised forward potion of the standard 40' ISO container trailer.

8. A chassis conversion saddle as in claim 7, wherein the upper plane surface of said central section of the conversions addle is defined by upper surfaces of the two main support beams of the conversion saddle.

9. A chassis conversion saddle as in claim 8, wherein the standard 20' intermodal container is supported on the central section by the two main support beams of the central section of the conversion saddle.

10. A chassis conversion saddle as in claim 9, wherein said central section of the conversion saddle includes two supporting cross beams separated by approximately a length of the standard 2' in modal container, such that said two supporting cross beams of the central section lie beneath structural cross members at lengthwise ends of the standard 20' intermodal container.

11. A chassis conversion saddle as in claim 10, wherein each of said two main support beams have a twist lock adjacent to each lengthwise end of the standard 20' intermodal container, and the twist locks engage the corner casings in these standard 20' intermodal container.

12. A chassis conversion saddle as in claim 11, wherein said movable deck plate of the rear section has an upper surface, a forward end and a rear end, and further has said fist position wherein it is supported by upper surfaces of the cross members of the rear section with the upper surface of the movable deck plate being coextensive with and parallel to the upper surface of the rear section.

13. A chassis conversion saddle as in claim 12, wherein said movable deck plate of the rear section has said second position wherein it extends as a loading ramp extending form the floor of the standard 20' intermodal container to the upper surface of the rear section.

14. A chassis conversion saddle as in claim 1, wherein said movable deck plate is substantially rectangular and has an angled lip at its forward end.

15. A chassis conversion saddle as in claim 1, wherein the slidable mounted includes a pair of races pivotably mounted to a cross beam of said rear section and extending lengthwise along said rear section, with said movable deck plate engaging the races.

16. A chassis conversion saddle as in claim 15, wherein each race defines a groove extending substantially parallel to the length of the standard 40' ISO trailer, and said movable deck plate includes a pair of pined which engage the grooves in each race.

17. The chassis conversion saddle as in claim 16, wherein said movable deck plate includes means for mechanically moving the movable deck plate between its first and second positions.

18. The chassis con version saddle as in claim 17, wherein said mechanical moving means includes pivotable eyelets in the upper surface of said movable deck plate, with the pivotable eyelets being separated by a nominal distance between forks of a forklift.

* * * * *

UNITED STATES PATENT AND TRADEMARK OFFICE
CERTIFICATE OF CORRECTION

PATENT NO. : 5,127,781  
DATED : July 7, 1992  
INVENTOR(S) : Hugh J. Roarty, et al Page 1 of 2

It is certified that error appears in the above-indentified patent and that said Letters Patent is hereby corrected as shown below:

In the Abstract, lines 17 & 26: "20°" should read as --20'--

Column 3, line 8: "provide s" should read as --provides--

Column 3, line 9: "trail" should read as --trailer--

Column 4, line 42: after "thereby" insert --.--

Column 7, line 31, Claim 1: "sadle" should read as --saddle--

Column 8, line 16, Claim 4: "tow" should read as --two--

Cclumn 8, line 18, Claim 4: "distances" should read as --distance--

Column 8, line 33, Claim 7: "potion" should read as --portion--

Column 8, line 37, Claim 8: "addle" should read -saddle--

Column 8, line 46, Claim 10: "2'" should read as --20'--

Column 8, line 54, Claim 11: "casing" should read as --castings--

UNITED STATES PATENT AND TRADEMARK OFFICE
CERTIFICATE OF CORRECTION

PATENT NO. : 5,127,781
DATED : July 7, 1992
INVENTOR(S) : Hugh J. Roarty, et al

It is certified that error appears in the above-indentified patent and that said Letters Patent is hereby corrected as shown below:

```
        Column 8, line 59, Claim 12:  "fist"   should read
as --first--
        Column 8, line 67, Claim 13:  "form"   should
read as --from--
        Column 9, line 5, Claim 15:   "mounted" should
read as --mount--
        Column 10, line 2, Claim 16:  "pined"  should
read as --pins--
        Column 10, line 7, Claim 18:  "con version"
should read as --conversion--
```

Signed and Sealed this

Twelfth Day of October, 1993

BRUCE LEHMAN

Attest:

*Attesting Officer*    *Commissioner of Patents and Trademarks*